United States Patent [19]

Opal

[11] 4,293,905
[45] Oct. 6, 1981

[54] METHOD AND APPARATUS FOR CONTROLLING POWER AND OPTIMIZING POWER FACTOR IN AN AC-TO-DC CONVERTER

[75] Inventor: Kenneth E. Opal, Oakmont, Pa.

[73] Assignee: Power Control Corporation, Pittsburgh, Pa.

[21] Appl. No.: 49,764

[22] Filed: Jun. 18, 1979

[51] Int. Cl.³ .............................................. H02M 7/00
[52] U.S. Cl. ..................................... 363/124; 363/39; 318/438; 318/729
[58] Field of Search ................. 363/34, 37, 39, 44–48, 363/124; 323/102, 105, 205, 207, 208; 318/438, 729, 345 R, 345 G; 315/247; 307/105

[56] References Cited

U.S. PATENT DOCUMENTS

| | | | |
|---|---|---|---|
| 3,603,864 | 9/1971 | Thaler | 363/48 |
| 3,636,424 | 1/1972 | Reed | 318/259 |
| 3,745,443 | 7/1973 | Weil | 323/DIG. 1 |
| 3,859,542 | 1/1975 | Kennedy | 307/105 |
| 3,913,002 | 10/1975 | Steigerwald et al. | 363/124 |
| 4,021,721 | 5/1977 | Tachibana | 323/DIG. 1 |
| 4,027,225 | 5/1977 | Elvin | 363/39 |
| 4,060,758 | 11/1977 | Wright | 323/17 |
| 4,074,344 | 2/1978 | Pitel | 363/48 |
| 4,119,907 | 10/1978 | Quinn | 323/105 |
| 4,145,650 | 3/1979 | Poppinger | 323/17 |
| 4,150,324 | 4/1979 | Naito | 318/139 |
| 4,193,111 | 3/1980 | Wester | 323/102 |
| 4,222,096 | 9/1980 | Capewell | 363/44 |

Primary Examiner—William M. Shoop
Assistant Examiner—Peter S. Wong
Attorney, Agent, or Firm—Thomas H. Murray

[57] ABSTRACT

A motor drive system for direct current motors and other similar loads in which the power factor presented to the line by the system remains close to unity for all operating conditions (e.g., all motor speeds). This is accomplished by rectifying an alternating current input voltage and thereafter chopping it to vary power input to the load. An important feature of the invention is the use of a choke at the output of the rectifier of sufficient size to insure that current pulses flowing from the rectifier will be continuous (i.e., will not drop to the zero voltage level) during the sequential ON periods of the rectifier elements.

7 Claims, 3 Drawing Figures

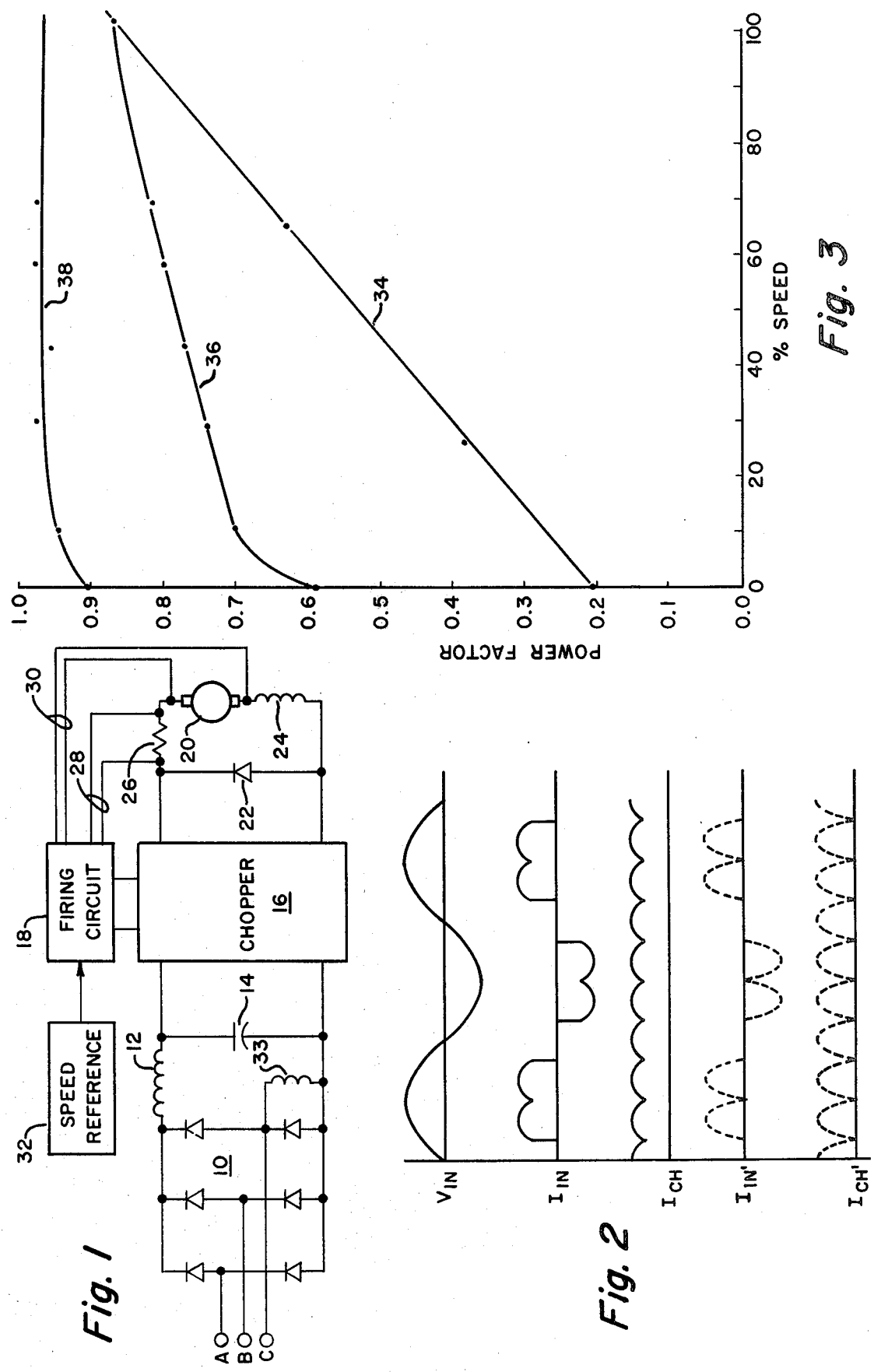

METHOD AND APPARATUS FOR CONTROLLING POWER AND OPTIMIZING POWER FACTOR IN AN AC-TO-DC CONVERTER

BACKGROUND OF THE INVENTION

As is known, direct current motors and other similar loads are usually powered from an alternating current distribution line by the use of a motor-generator set or by a converter employing phase-controlled semiconductive-controlled rectifiers, the latter being used almost exclusively today. It is also known that the power factor of a converter-controlled direct current motor will vary from a relatively high value at full rated speed to a very low value at lower speeds, and that this power factor and resultant loss in useful power is reflected back to the distribution system through the converter. Heretofore, no satisfactory system has been devised for maintaining the power factor of the DC motor at anything close to unity for all motor speeds.

SUMMARY OF THE INVENTION

In accordance with the present invention, a method and apparatus are provided for maintaining the power factor of an inductive load, such as a direct current motor, close to unity for all motor speeds. This is achieved by rectifying an alternating current power source, filtering the output of the rectifier, and then chopping the filtered, direct current voltage and applying it to the motor. Motor speed is varied by varying the width of the pulses at the output of the chopper to vary the average voltage applied to the motor.

In an arrangement of this type, the power factor presented by the rectifier, filter, chopper and motor remains at essentially unity for all motor speeds. Stated in other words, an essentially resistive load is presented to the line. However, in order to achieve this desirable result, it is necessary, or at least desirable, to employ a choke in the aforesaid filter at the output of the rectifier of sufficient size such that during the sequential conduction periods of the rectifiers, the current pulses flowing through the rectifiers are continuous, or substantially continuous.

The above and other objects and features of the invention will become apparent from the following detailed description taken in connection with the accompanying drawings which form a part of this specification, and in which:

FIG. 1 is a schematic circuit diagram of a control system in accordance with the invention;

FIG. 2 comprises waveforms illustrating the operation of the circuit of FIG. 1; and FIG. 3 comprises a plot of motor speed versus power factor showing the effect of the present invention as compared with a conventional semiconductive-controlled rectifier converter.

With reference now to the drawings, and particularly to FIG. 1, a three-phase, full-wave rectifier 10 is shown connected to the three phases A, B and C of a three-phase power supply, not shown. The output terminals of the rectifier 10 are, in turn, connected to a filter comprising an inductor or choke 12 and capacitor 14. The filtered direct current voltage is then applied to a chopper 16 which produces output pulses of varying width, depending upon the width of firing pulses applied thereto from firing circuit 18. Typically, the chopper 16 will comprise semiconductive-controlled rectifiers which are caused to conduct by the firing pulses from circuit 18. The pulses at the output of chopper 16 are then applied across a direct current motor 20 connected in parallel with a free-wheeling diode 22. Typically, the direct current motor 20 may have a series field winding 24 and/or a shunt field winding, not shown. A signal proportional to motor current is derived across resistor 26 and applied back to the firing circuit through leads 28. Similarly, a signal proportional to motor voltage or speed is applied through leads 30 to the firing circuit where it is compared with a reference voltage from reference voltage source 32 to achieve speed control.

The choke 12 comprises an isolation medium between the chopper 16 and the rectifier 10. As long as the choke 12 continuously draws current, the isolation will be effective and the load appearing to the three-phase input A, B, C will appear resistive. The size of the choke 12, however, must be such that the current pulses through the choke are continuous. This is illustrated in FIG. 2 where the line to neutral input voltage is shown relative to the associated input line current pulses, for example, and is identified by the waveform $V_{IN}$. The waveform $I_{IN}$ comprises the input AC line current pulses applied to the rectifier 10. It can be seen that the pulses occurring during each 120° interval of the input voltage are continuous. That is, they do not drop to zero until the pulse is terminated. The corresponding DC choke current $I_{CH}$ is also shown. If the choke 12 is not of sufficient magnitude, a waveform such as waveforms $I_{IN}$, and $I_{CH}$, shown in FIG. 2 will result wherein the current drops to the zero level during a 120° input interval. Under these conditions, the desirable power factor characteristics of the invention are mitigated.

With reference to FIG. 3, curve 34 represents a typical power factor curve for a direct current motor driven by a semiconductive-controlled rectifier converter. It will be noted that at full-motor speed, the power factor is approximately 0.85; whereas when the speed of the motor is only about 5% of its full rated speed, the power factor drops to almost 0.2. If the rectifier 10 is connected to the chopper 16 utilizing only the shunt capacitor 14, a curve such as curve 36 of FIG. 3 will result. Note that while the power factor characteristics are improved, they are still not ideal. When, however, a choke 12 of sufficient size is added to the circuit, the curve 38 of FIG. 3 results wherein the power factor is substantially unity (i.e., about 0.95) under all motor speed conditions except when the motor speed drops to about 20% of full rated speed, at which point the power factor drops slightly.

The present invention thus provides a means for driving a direct current motor over a wide range of speeds while maintaining substantially unity power factor. Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A method for supplying variable direct current power to a load while maintaining essentially unity power factor, which comprises rectifying a source of alternating current, applying the rectified current across an inductor in series with a capacitor with the size of the inductor being such as to maintain the current pulses at the input to the rectifier essentially continuous current pulses, said current pulses occurring during a portion of each half-cycle of said alternating current source, chopping said rectified current to produce direct current pulses, and applying said direct current pulses to said load.

2. The method of claim 1 wherein one direct current pulse is produced during 120° of each half-cycle of the applied source of alternating current.

3. The method of claim 1 wherein the rectified current is chopped by applying the voltage appearing across said capacitor to the input of a chopper circuit.

4. The method of claim 1 wherein said load comprises a direct current motor.

5. Apparatus for supplying variable direct current power to a load comprising means for rectifying a source of alternating current voltage, an inductor and a capacitor connected in series across the output of said rectifying means, the size of said inductor being such as to maintain current pulses at the input to said rectifying means essentially continuous current pulses, said current pulses occurring during a portion of each half-cycle of said alternating current voltage, chopper means, means for applying the voltage across said capacitor to the input of said chopper means, and a load connected across the output of said chopper means.

6. The apparatus of claim 5 wherein said load comprises a direct current motor.

7. The apparatus of claim 6 including a diode connected in shunt with said motor.

* * * * *